United States Patent [19]

Swanson

[11] 4,394,065
[45] Jul. 19, 1983

[54] WINDSHIELD VISOR MIRROR

[76] Inventor: Arthur P. Swanson, 1454 Estate La., Glenview, Ill. 60025

[21] Appl. No.: 420,899

[22] Filed: Sep. 21, 1982

[51] Int. Cl.³ .............................................. B60R 1/08
[52] U.S. Cl. .................................... 350/304; 350/307
[58] Field of Search ............... 350/277, 288, 300, 303, 350/304, 307; 296/97 R, 97 C

[56] References Cited

U.S. PATENT DOCUMENTS

| | | |
|---|---|---|
| 1,376,377 | 4/1921 | Mee . |
| 1,420,145 | 6/1922 | Rees . |
| 2,214,639 | 5/1939 | Lenta .................................... 88/87 |
| 2,276,585 | 3/1942 | Mandel ............................ 296/97 C |
| 2,539,763 | 4/1950 | Wilson ................................ 296/95 |
| 2,573,812 | 11/1951 | Schroeder ............................ 88/86 |
| 2,582,651 | 1/1952 | Peterson .............................. 88/87 |
| 2,591,318 | 4/1952 | Tomeo ................................. 88/92 |
| 2,802,394 | 8/1957 | Krone .................................. 88/86 |
| 2,976,763 | 3/1961 | Anderson ............................ 88/87 |
| 3,009,392 | 11/1961 | Snell .................................... 88/87 |
| 3,021,756 | 2/1962 | Milton et al. ........................ 88/86 |
| 3,145,257 | 8/1964 | Suga .................................... 88/87 |
| 3,494,689 | 2/1970 | McGlinchy ....................... 350/307 |
| 3,625,599 | 12/1971 | Polrier .............................. 350/307 |
| 3,671,110 | 6/1972 | Van Wassenhove ............... 350/307 |
| 3,806,233 | 4/1974 | Stefano ............................. 350/307 |
| 3,843,236 | 12/1974 | Kurz, Jr. ........................... 350/288 |
| 3,950,081 | 4/1976 | Yamashita et al. ............... 350/302 |
| 3,957,357 | 5/1976 | Kulikowski ...................... 350/304 |
| 3,979,158 | 9/1976 | Yamashita et al. ............... 350/302 |
| 4,000,404 | 12/1976 | Marcus ................................ 240/2 |
| 4,019,812 | 4/1977 | Carnine ............................ 350/304 |
| 4,114,989 | 9/1978 | Badgley ............................ 350/302 |
| 4,133,405 | 1/1979 | Turek ................................. 180/90 |
| 4,187,001 | 2/1980 | Redwitz et al. .................. 350/202 |

FOREIGN PATENT DOCUMENTS 2247042 4/1974 Fed. Rep. of Germany ...... 350/303

Primary Examiner—F. L. Evans
Attorney, Agent, or Firm—Hill, Van Santen, Steadman, Chiara & Simpson

[57] ABSTRACT

A mirror assembly mountable on conventional automobile vehicle windshield visors of the type swingable from an upright dependent use position between the driver and the windshield and an overhead storage position above the windshield has a frame clipped on the visor swingable to a depending position in front of the driver in both the use and storage positions of the visor with a mirror hinged on the frame to swing laterally of the visor to positions providing clear vision to the driver of the blind spot along the driver's side adjacent the rear end of the vehicle. In visor installations swinging forwardly to a storage position, a single fore and aft swinging hinged mirror unit is sufficient. In visor installations swinging rearwardly to a storage position, a pair of mirror units are provided to overlie both faces of the visor. The mirror hinge extends transversely of the visor face so that the mirror swings laterally of the visor to reflect through the front door window or opening on the dirver's side of the vehicle while depending directly in front of the eyes of the driver to reflect the blind spot area along the driver's side of the vehicle adjacent the rear end of the vehicle, which is not within the viewing range of conventional windshield mounted rear view mirrors or exterior side view mirrors. The lateral swing and the fore and aft swing of the mirror is frictionally resisted to hold its adjusted position.

14 Claims, 8 Drawing Figures

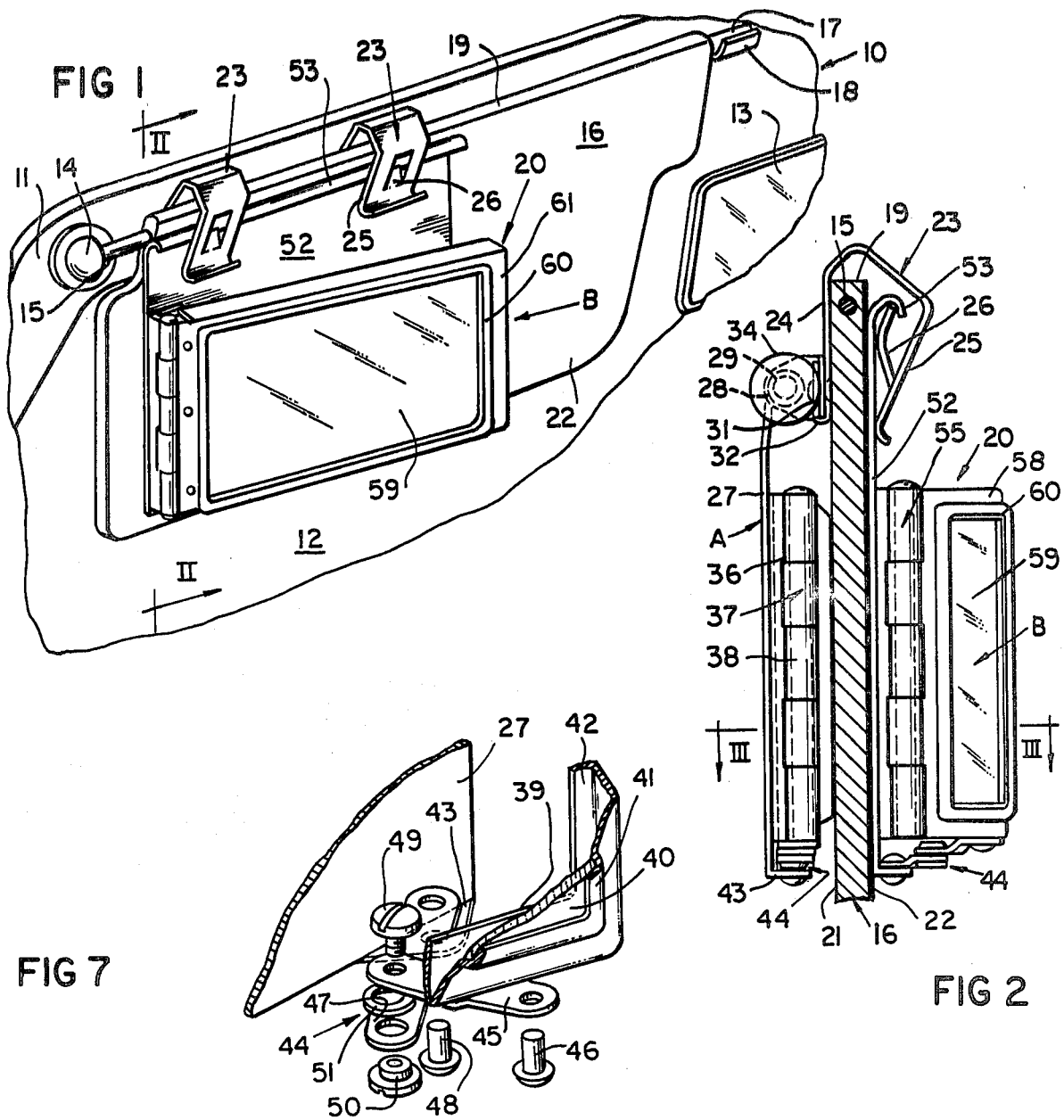
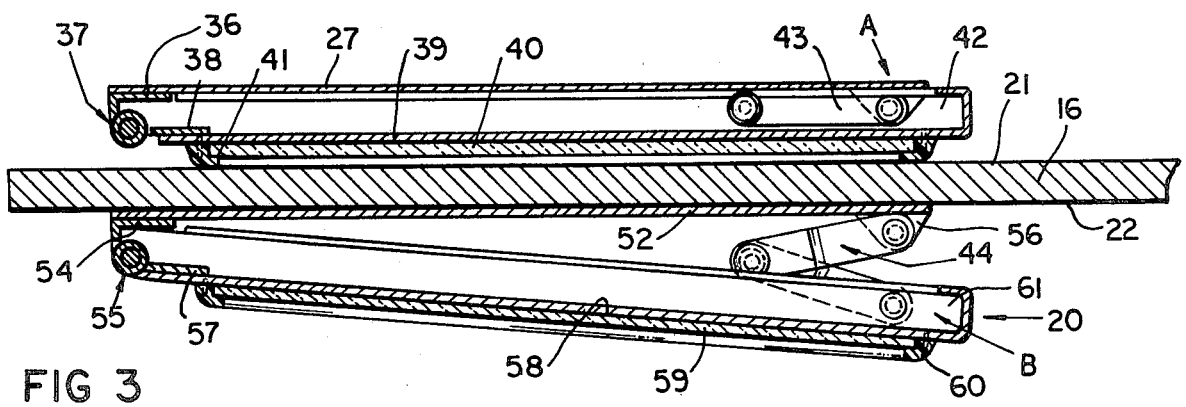

WINDSHIELD VISOR MIRROR

BACKGROUND OF THE INVENTION

1. Field of the Invention

This invention relates to the art of rear view mirrors for vehicles which will provide clear vision to the vehicle driver of the blind spot at the rear side edge of the vehicle which is out of the range of conventional rear view mirrors, and particularly deals with a rear view mirror assembly adapted to be fastened on conventional windshield visors which are adjusted on the visor from its stored or use position to reflect the area along the driver's side and adjacent the rear end of the vehicle that is normally out of the range of rear view mirrors.

2. Prior Art

Conventional rear view mirrors for vehicles are mounted on or above the windshield providing a line of vision through the rear window of the vehicle or are mounted outside the vehicle just forwardly of the driver's seat. The areas along the driver's side of the vehicle adjacent the rear end of the vehicle are out of the viewing range of such mirrors and a troublesome and dangerous "blind spot" prevents the driver from viewing an oncoming vehicle as it starts to pass on the driver's side. The oncoming vehicle is not seen by the driver until its front end is almost up to the driver's seat. Many accidents have occurred when the driver turns into the traffic lane of the oncoming vehicle because the conventional mirrors do not show this lane to be occupied.

Elaborate telescope-type rear view mirrors, cumbersome laterally extending mirrors and the like have been proposed to view this blind spot. However, the telescoping type mirrors require cutting holes through the vehicle roof, and they are too expensive to be practical, while the cumbersome laterally projecting mirrors block forward vision and project into adjoining traffic lanes sufficiently to provide a hazard.

It would then be an improvement in this art to provide rear view mirrors mounted on conventional vehicle windshield visors which are capable of giving a clear view of heretofore encountered blind spots to the driver of the vehicle without interfering with the use of the visor.

SUMMARY OF THE INVENTION

According to this invention, windshield visor mirrors are provided to view heretofore encountered blind spots in conventional rear view mirrors and are useful in any position of the visor. The mirrors of this invention are conveniently clipped on or otherwise removably mounted on the visor and are adjusted relative to the visor to pick up the heretofore encountered blind spot of rear view mirrors regardless of the position of the visor. In the use or "down" position of the visor, the mirror may hug the rear face of the visor. In the storage or "up" position of the visor, the mirror may depend in front of the driver's eyes away from the visor face. In those visor installations where the visor is stored along the roof of the vehicle rearwardly of its hanger, a mirror is mounted on each face of the visor so that one mirror is in front of the driver when the visor is in its down position and so that another mirror depends from the visor when it is in its up position. In those visor installations where the hanger bar is sufficiently rearward of the windshield to accommodate a forward swinging of the visor to its up or storage position, only one mirror may be provided to overlie the rear face of the visor in its down position and to depend from the hanger away from the visor face when it is stored forwardly.

In the single mirror installation, the mirror is hinged on a frame so as to swing fore and aft from a position hugging the visor face to a position for viewing the blind spot.

The mirror or pair of mirrors are easily clipped to the top edge of the visor to be positioned directly in front of the driver's eyes and swing laterally of the visor to reflect through the door opening alongside the driver to view the blind spot. The visor can remain parallel with the windshield in a desired use position and need no be swung to a side position.

Friction holders maintain the mirrors in the selected position during use and storage.

It is then an object of this invention to provide a mirror assembly adapted to be mounted on a vehicle windshield visor of the type swingable from an overhead horizontal storage position to a depending use position directly in front of the driver's eyes at the windshield, which also swings laterally of the visor to provide the driver with clear vision of the blind spot area on the driver's side adjacent the rear end of the vehicle.

Another object of the invention is to provide a mirror assembly adapted to be mounted on a vehicle windshield visor of the type swingable from a depending vertical use position in front of the windshield to a stored forward position for providing clear vision to the driver of the vehicle of the heretofore encountered blind spot areas of conventional rear view mirrors.

Another object of the invention is to provide a mirror assembly adapted to be mounted on the front and rear faces of an automobile visor of the type swingable from a depending use position between the driver and the windshield to a rearwardly extending overhead storage position which will provide clear vision along the driver's side adjacent the rear end of the vehicle regardless of the use or storage position of the visor.

A specific object of the invention is to provide a windshield visor mounted rear view mirror clipped on the top edge of the visor and swingable relative to the visor to adjust the position relative to the visor.

A specific object of the invention is to provide a visor mounted rear view mirror assembly having a mirror on both faces of the visor swingable to adjust the positions for providing the driver with a clear vision of the blind spot area along the driver's side adjacent the rear end of the vehicle regardless of the position of the visor.

Other and further objects of this invention will be apparent to those skilled in this art from the following detailed description of the annexed sheets of drawings which, by way of preferred embodiments, show several examples of the invention.

ON THE DRAWINGS

FIG. 1 is a fragmentary perspective view of a conventional vehicle windshield visor assembly with a mirror assembly of this invention clipped on the visor.

FIG. 2 is a transverse cross-sectional view along the line II—II of FIG. 1 showing the front and rear mirrors of the assembly.

FIG. 3 is a longitudinal cross-sectional view along the line III—III of FIG. 2.

FIG. 7 is a fragmental exploded perspective view showing the components of a friction arm assembly to mount a mirror in an adjusted position laterally of the visor.

DESCRIPTION OF THE PREFERRED EMBODIMENTS

Figure 4:
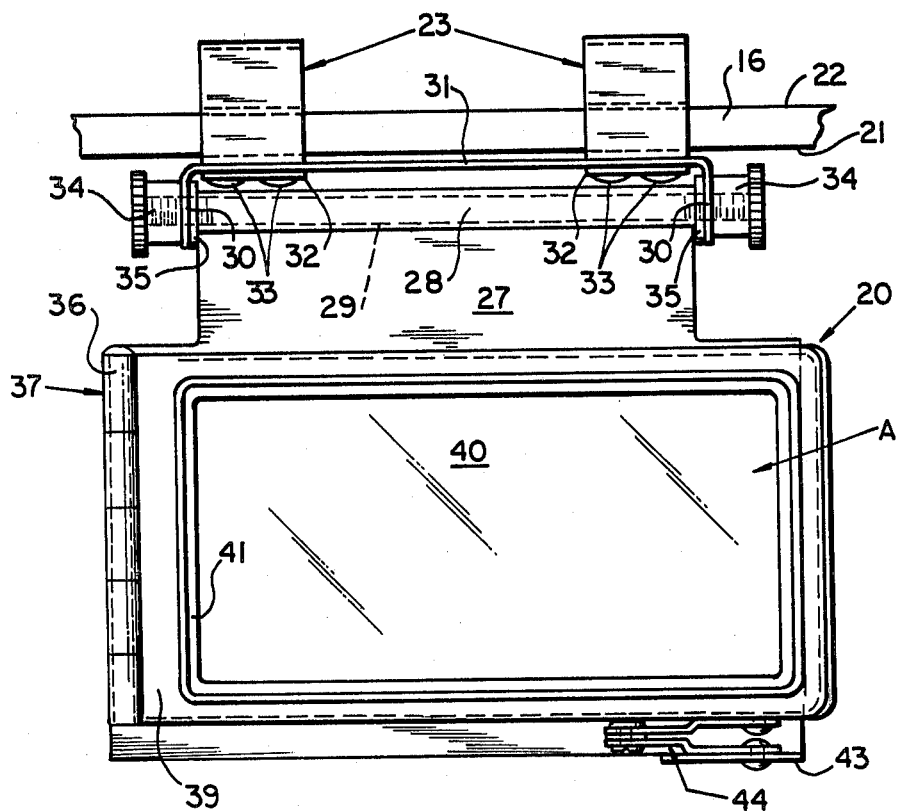
FIG. 4 is a face view of the front mirror depending from the visor in the rearward horizontal storage position of the visor.

The assembly 10 of FIG. 1 is an inside view of the driver's side of an automobile vehicle with a windshield assembly having a peripheral frame 11, a windshield 12, a conventional rear view mirror 13 mounted on the windshield 12, a bracket 14 on the frame 11 swingably mounting a support rod 15 for a windshield visor 16 with the free end 17 of the rod 16 releasably secured in a holding bracket 18 also mounted on the frame 11. The upper edge 19 of the visor 16 provides a bushing receiving the rod 15 therethrough in relatively tight frictional engagement therewith but the visor can swing from an upright or vertical down or use position illustrated in FIG. 1 to a rearwardly extending horizontal storage position just under the roof of the vehicle. The free end 17 of the rod 15 can be released from the bracket 18 and the rod can be swung on the bracket 14 from the position illustrated in FIG. 1 to a position overlying the front door area of the vehicle (not shown).

This invention now provides a rear view mirror assembly 20 suspended on both the front face 21 and the rear face 22 of the visor 16 by means of a pair of spring clips 23 snapped over the top edge 19 of the visor. Each clip 23 has a front leg 24 overlying the front face 21 of the visor and a rear leg 25 overlying the rear face 22 of the visor with a spring finger 26 lanced from the central portion of the rear leg 25 and depressed toward the front leg 24.

The mirror assembly 20 is positioned laterally on the visor to be directly in front of the driver's eyes when the end 17 of the visor support rod 15 remains in its bracket 18.

A front mirror A of the assembly 20 has a plate frame 27 curled along its upper edge providing a tube 28 receiving a pin or shaft 29 projecting through ears 30 on the ends of a strap 31 which is secured in looped ends 32 of the clip legs 24 by screws or rivets 33 as shown in FIGS. 2 and 4. The pin 29 has threaded ends beyond the ears 30 receiving cap nuts or knobs 34 bottoming on the ears 30. Friction washers 35 on the pin 29 are positioned between the ends of the tube 28 and the ears 31 so that when the nuts 34 are tightened against the ears, the frame plate 27 is locked against swinging relative to the visor.

The frame plate 27 is thus swingably suspended from the clips 23 and locked in adjusted position.

One leaf 36 of a hinge 37 is secured to the plate 27 along its left hand edge as viewed in FIGS. 3 and 4 with the other leaf hinge 38 secured to a frame plate 39 on which is fixed a mirror 40 by means of a moulding 41 surrounding the mirror and fastened to the plate 39. The frame 39 has a rearwardly channeled periphery 42, the bottom leg of which is spaced above an ear 43 on the bottom of the plate 27 adjacent its free right hand end.

Figure 8:
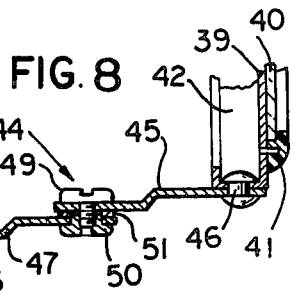
FIG. 8 is a vertical cross-sectional view of the friction arm.

A friction swing arm assembly 44 has a first arm 45 with one end pivoted on a rivet 46 secured to the bottom leg of the channel 42 as shown in FIGS. 7 and 8. A second arm 47 of the assembly 44 has one end pivoted to the ear 43 of the plate 27 by a rivet 48. The other ends of the arms 45 and 47 overlap and are joined by a friction pivot assembly including a bolt 49, a nut 50 and a friction washer 51. The shank of the bolt projects freely through a hole in the overlying arm 45, the nut 50 has a collar projecting into a hole in the underlying arm 47 and the friction washer 51 surrounds the collar between the arms so that a tightening of the nut on the bolt will squeeze the washer to resist relative swinging of the arms 45 and 47.

The mirror B of this assembly 20 has a frame plate 52 with a downturned hook top edge 53 suspended from the fingers 26 of the clips 23 and pressed by the legs 25 of the clips against the rear face 22 of the visor 16. Like the plate 27, the plate 52 has one leaf 54 of a hinge 55 secured along its left hand end and has an ear 56 projecting rearwardly from its bottom free end. The other leaf 57 of the hinge is secured to a mirror plate 58 carrying on its rear face a mirror 59 surrounded by a moulding 60 fastened to the plate. The plate 58, like the plate 39, has a peripheral channel 61 projecting toward the visor 16.

A second friction arm assembly 44 connects the ear 56 with the bottom leg of the channel 61.

From the above descriptions, it will be understood that the mirror units A and B of the assembly 20 are respectively suspended by clips 23 from the top edge of the visor 16 with the mirror unit A overlying the visor front face 21 while the unit B overlies its rear face 22. The units are positioned laterally on the visor to depend directly in front of the driver's eyes when in use with the visor arm 15 secured in its bracket 18. With the visor in its up or storage position along the roof of the vehicle rearwardly of the support arm 15, the mirror assembly A is pulled down from the plane of the visor by means of its pivot suspension on the pin 29 to lie suspended in front of the driver's eyes and the mirror 40 is swung on its hinge 37 to view the "blind spot area".

On the other hand, when the visor is in its upstanding or use position behind the windshield, the mirror B is used to pick up the "blind spot".

Figure 5:
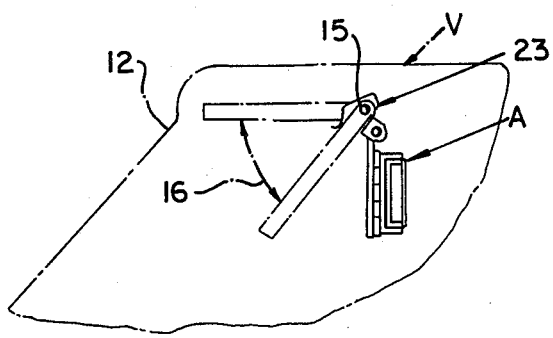
FIG. 5 is a somewhat diagrammatic side elevational view, of a vehicle having a visor of the type movable forward to a storage position with only the front mirror of this invention mounted thereon.

The mirror unit B is easily removed from the clips 23 by sliding the hook top 53 of the plate 52 laterally off of the fingers 26 or by lifting the clips 23 and pulling the fingers 26 free from the hook top 53. The mirror unit A can be used alone on visors which swing forwardly to a storage position. Thus, as shown in FIG. 5, a vehicle V having sufficient space between the visor support rod 15 and the windshield 12 to tilt the visor 16 forwardly to a storage position need only be equipped with the unit A. For this single mounting, the clips 23 are reversed from the positions of FIGS. 1, 2 and 4 to suspend unit A rearwardly, instead of forwardly of the visor. Then the unit is visible in all portions of the visor.

Figure 6:
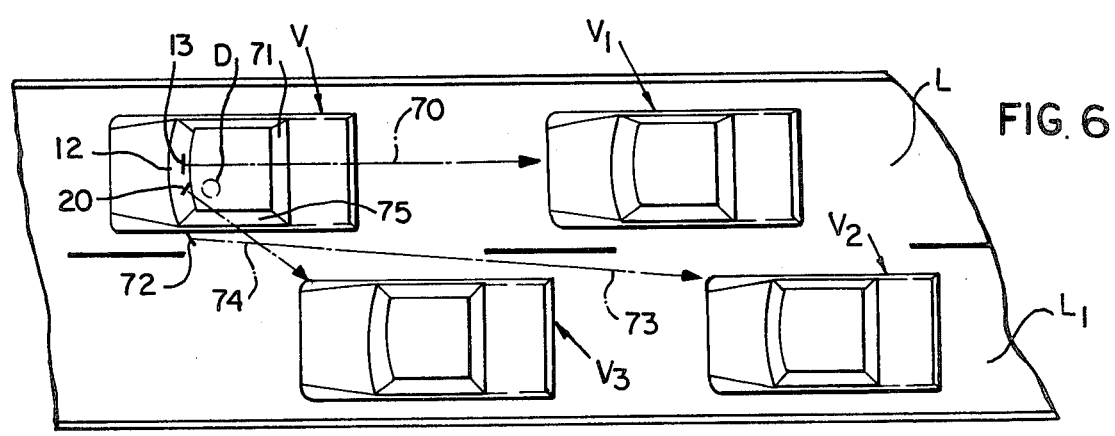
FIG. 6 is a diagrammatic view illustrating the manner in which the visor mounted mirror assemblies of this invention pick up areas not viewed by conventional inside and outside vehicle mounted rear view mirrors.

FIG. 6 illustrates the manner in which the windshield visor mirrors of this invention give the driver a clear view of the blind area which is not capable of being viewed by conventional interior or exterior mounted rear view mirrors. Thus, as shown in FIG. 6, a vehicle V with the windshield 12 and a conventional rear view mirror 13 provides the driver D with a line of vision 70 through the rear window 71 of only an oncoming vehicle $V_1$ immediately therebehind in the same lane L. A conventional side view mirror 72 mounted outside the vehicle V then only gives the driver D a line of vision 73 to an oncoming vehicle $V_2$ in the traffic lane $L_1$ alongside the lane L, but as illustrated, a vehicle $V_3$ in the same traffic lane ahead of the vehicle $V_2$ is out of the sight lines 70 and 73 of both mirrors 13 and 72. Thus, conventional interior and exterior mounted rear view mirrors cannot view a blind area in the traffic lane to the left of the driver adjacent the rear end of the vehicle. The mirror assembly 20 of this invention, by being positioned directly in front of the driver D and capable of being angled to give a line of sight 74 through the front window 75 of the vehicle, picks up the blind spot area to give the driver clear vision of the vehicle $V_3$. The driver, therefore, will not turn into the traffic land ahead of the vehicle $V_3$.

From the above description, it will be understood that this invention provides windshield visor mounted rear view mirror assemblies which give clear vision to heretofore encountered blind spots in conventional rear view mirrors for vehicles. It will also be understood that the mirror assemblies of this invention are operative regardless of the position of the visor but can be tilted with the visor.

It will also be understood that the detailed constructions of the above-described and illustrated embodiments of the invention can be widely varied without departing from the principles of the invention as defined by the scope of the claims.

I claim as my invention:

1. A vehicle windshield visor mounted rear view mirror adapted to reflect to the vehicle driver the area in the traffic lane alongside the driver at the rear end of the vehicle, which comprises a mirror unit having a base, means for mounting the base against a face of a windshield visor and said unit having a mirror with an end adjacent the traffic lane hinged on the base to swing the mirror laterally of the visor face to reflect said area.

2. The mirror of claim 1 wherein the means for mounting are clips overlying both faces of the visor holding the base tightly against the visor face.

3. The mirror of claim 2 wherein the clips straddle the upper edge of the visor and a second mirror unit is suspended by the clips over the opposite face of the visor.

4. The mirror of claim 1 wherein the mirror is mounted on a frame hinged to said base which swings fore and aft relative to the visor face.

5. The mirror of claim 1 including a second mirror unit on the opposite face of the visor.

6. The mirror of claim 1 including adjustable means controlling resistance to swinging of the mirror.

7. A mirror assembly adapted to be mounted on a vehicle windshield visor of the type swingable about a top edge thereof from a depending vertical use position in front of the windshield to a stored position for providing clear vision to the driver of the blind spot along the driver's side adjacent the rear end of the vehicle which comprises a frame swingably suspended from the visor to overlie the visor in its use position and to depend in front of the driver in the storage position of the visor and a mirror hinged on said frame to swing laterally of the visor to positions for reflecting the blind spot area to the driver.

8. The mirror assembly of claim 7, including friction means holding the hinged mirror against unauthorized swinging.

9. The mirror assembly of claim 7, including clips embracing the top edge of the visor suspending the mirror frame.

10. The mirror assembly of claim 7, including means locking the frame against swinging.

11. A mirror assembly adapted to be mounted on the front and rear faces of a vehicle windshield visor to give the driver of the vehicle clear vision of the blind spot area along the driver's side adjacent the rear end of the vehicle which comprises a pair of mirror frames, means for respectively mounting a frame of the pair on the front and rear faces of a windshield visor, a mirror hinged on each frame to swing relative to the visor for reflecting said blind spot area to the driver, and means swingably mounting the frame on the front face of the visor to suspend the mirror in front of the driver when the visor is raised.

12. The mirror assembly of claim 11, including a removable suspension for the frame on the rear face of the visor adapting use of the front mirror alone.

13. The mirror of claim 11, including means mountable on the visor detachably mounting the pair of mirror frames to overlie both faces of the visor.

14. A mirror assembly adapted to be mounted on the front and rear faces of an automobile windshield visor of the type swingable from a stored overhead horizontal position to an upright use position between the driver and windshield for providing to the driver in both stored and use positions of the visor a clear vision of the blind spot along the driver's side adjacent the rear end of the automobile which comprises a front frame swingably suspended on the visor to overlie the front face of the visor in its use position and to depend in front of the driver in the storage position of the visor, a back frame overlying the back face of the visor, and a mirror hinged to each frame to swing laterally of the visor faces to positions for reflecting the blind spot area to the driver.

* * * * *